(12) United States Patent
Gaedke

(10) Patent No.: US 9,174,664 B2
(45) Date of Patent: Nov. 3, 2015

(54) OPERATING DEVICE FOR STEERING A VEHICLE AND METHOD FOR STEERING THE VEHICLE

(71) Applicant: ZF LENKSYSTEME GMBH, Schwaebisch Gmuend (DE)

(72) Inventor: Alexander Gaedke, Mutlangen (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 0 days.

(21) Appl. No.: 14/062,061

(22) Filed: Oct. 24, 2013

(65) Prior Publication Data
US 2014/0052338 A1 Feb. 20, 2014

Related U.S. Application Data

(63) Continuation of application No. PCT/EP2012/061254, filed on Jun. 14, 2012.

(30) Foreign Application Priority Data

Jul. 1, 2011 (DE) .......................... 10 2011 051 488

(51) Int. Cl.
*B62D 1/12* (2006.01)
*B62D 1/02* (2006.01)
*G05G 9/047* (2006.01)

(52) U.S. Cl.
CPC .. *B62D 1/12* (2013.01); *B62D 1/02* (2013.01); *G05G 2009/04774* (2013.01)

(58) Field of Classification Search
CPC ............. B62D 1/02; B62D 1/12; B62D 1/22; G05G 2009/04774; G05G 1/01; G05G 1/04; G05G 1/08; G05G 1/58; E02F 9/2004
USPC ..................... 701/41; 180/333, 334
See application file for complete search history.

(56) References Cited

U.S. PATENT DOCUMENTS

| | | | |
|---|---|---|---|
| 4,042,902 A * | 8/1977 | Meyer et al. ................... | 338/128 |
| 7,204,338 B2 * | 4/2007 | Katae et al. .................... | 180/315 |
| 7,334,658 B2 * | 2/2008 | Berg et al. ...................... | 180/333 |
| 7,562,738 B2 | 7/2009 | Suyama et al. | |
| 2005/0057031 A1 * | 3/2005 | Ahnafield ....................... | 280/771 |
| 2005/0239594 A1 * | 10/2005 | Fulghum et al. .................. | 477/1 |
| 2006/0118350 A1 | 6/2006 | Suyama et al. | |
| 2006/0137931 A1 | 6/2006 | Berg et al. | |
| 2008/0281442 A1 * | 11/2008 | Huckemann et al. ........... | 700/85 |
| 2011/0282550 A1 | 11/2011 | Tada et al. | |

FOREIGN PATENT DOCUMENTS

| | | | |
|---|---|---|---|
| DE | 199 51 379 | 5/2001 | |
| DE | 19951379 | * 5/2001 | ............... B60N 2/46 |
| DE | 100 62 505 | 6/2002 | |
| DE | 10 2005 058 711 | 7/2006 | |
| FR | 2 845 962 | 4/2004 | |
| WO | WO-2010/089945 | 8/2010 | |

\* cited by examiner

*Primary Examiner* — Marthe Marc-Coleman
(74) *Attorney, Agent, or Firm* — Jordan and Hamburg LLP

(57) ABSTRACT

An operating device for steering a vehicle, in particular a motor vehicle, and a method for steering the vehicle by way of the operating device. The operating device comprises a control stick, in particular for operation by a human hand. The control stick has at least one degree of freedom. A steering angle can be specified by way of the control stick. The operating device comprises a control element. The specifiable steering angle can be determined as a function of a state of the control stick and as a function of a state of the control element.

13 Claims, 5 Drawing Sheets

OPERATING DEVICE FOR STEERING A VEHICLE AND METHOD FOR STEERING THE VEHICLE

This is a Continuation of PCT/EP2012/061254 filed Jun. 14, 2012.

BACKGROUND OF THE INVENTION

The invention relates to an operating device for steering a vehicle and to a method for steering the vehicle.

The use of a control stick for transverse guidance of a vehicle is known. Such a control stick can be used in conjunction with an electric power steering (EPS) system, or also in conjunction with a steer-by-wire (SBW) steering system. The state of the control stick thus determines a steering angle that is specified to the steering system.

It is further known that operating the control stick during long trips, for example when driving on a highway, results in symptoms of fatigue of the driver's hand.

Therefore, it is the object of the invention to improve the driving comfort when steering by way of a control stick and to prevent symptoms of fatigue of the driver's hand.

SUMMARY OF THE INVENTION

Characteristics that are important to the invention can further be found in the following description and in the drawings, wherein the characteristics can be important for the invention both alone and in various combinations, without further explicit reference being made thereto. By additionally providing a control element, and by determining a steering angle that can be specified to a steering system as a function of the state of the control stick and as a function of a state of the control element, transverse guidance is no longer solely dependent on the state of the control stick, but the state of the control element is also taken into consideration. This creates an additional option for the driver to influence the steering angle for the steering system. As a result, an alternative for operating the control stick is created, and fatigue of the driver's hand is precluded.

In an advantageous embodiment of the operating device, the control element is disposed on the control stick. This advantageously improves the operation of the control stick because the hand of the vehicle driver remains on the control stick during operation of the control element. This increases the safety, while improving the operating comfort, because the control stick can be in a zero position and the control element is operated with only one finger to carry out minor corrections when driving the vehicle straight ahead. As a result, it is not necessary to move the entire control stick.

In a further alternative embodiment of the operating device, the control element is disposed on a console in the region of the control stick. For this purpose, the hand may be located on, or in the region of, the control stick, and the control element can be operated while the hand is resting, for example using a finger. This results in the same advantages with respect to operating comfort and operating safety as with the above-mentioned embodiment.

In a further advantageous embodiment, the control element has a single degree of freedom. This advantageously results in easy operation of the control element, and the steering angle for the steering system can be specified by the vehicle driver in a fault-free manner.

In a further advantageous embodiment, a restoring mechanism is associated with the control element, the mechanism being designed to move the control element from a deflection position, which corresponds to a steering state of the control element, back to the zero position thereof. If the control element is operated by the vehicle driver, which is to say is brought into the deflection position thereof, and thus into a steering state, this state has an effect on the steering angle that is specified to the steering system. Because during non-operation, which is to say when no force is applied by the vehicle driver, the control element is moved back into the zero position thereof, the vehicle driver receives haptic feedback, which conveys to the vehicle driver that an operation of the control element will only result in a correction of the straight-ahead travel.

In an advantageous embodiment of the method, the control stick is essentially in a zero position, and the control element is essentially in the steering position thereof. For this purpose, a third signal, which corresponds to a specifiable steering angle, is essentially determined from a second signal, which is formed as a function of the steering position of the control element. A first signal, which is determined as a function of a state of the control stick, does not play a role for the steering angle in this context insofar as the control stick is essentially in the zero position thereof. As a result, advantageously only the control element must be moved to correct the specified steering angle, and the control stick itself can remain in the zero position. This embodiment corresponds to a first operating mode of the operating device.

In a further embodiment of the method corresponding to a second operating mode of the operating device, both the control stick and the control element are in a steering state. For this purpose, the third signal is essentially determined from the first signal and the second signal. The steering states of the control stick and of the control element are thus advantageously superimposed, and the control element can be used to correct the steering angle specified by the control stick, whereby the operating comfort of the operating device is increased.

In an advantageous embodiment of the method, a magnitude of the slope of the second signal, which is to say a change of the second signal over time, is limited by a change threshold value. This advantageously prevents the steering system from carrying out major steering maneuvers, such as those that can be triggered by the control stick, for example, by way of the control element.

In a further advantageous embodiment, the second signal is limited by a threshold value. As described above, this has the advantage that the control element can only be used to perform corrections of the specified steering angle.

Additional characteristics, application options and advantages of the present invention will be apparent from the following description of exemplary embodiments of the invention, which are illustrated in the figures. All of the described or illustrated characteristics, either alone or in any arbitrary combination, form the subject matter of the invention, regardless of the combination thereof in the claims or the dependency reference thereof, as well as regardless of the formulation or illustration thereof in the description or drawings. Identical reference numerals are used for functionally equivalent variables in all the figures, even if the embodiments are different.

Exemplary embodiments of the invention will be described hereafter with reference to the drawings.

DETAILED DESCRIPTION OF THE PREFERRED EMBODIMENTS

Figure 1:
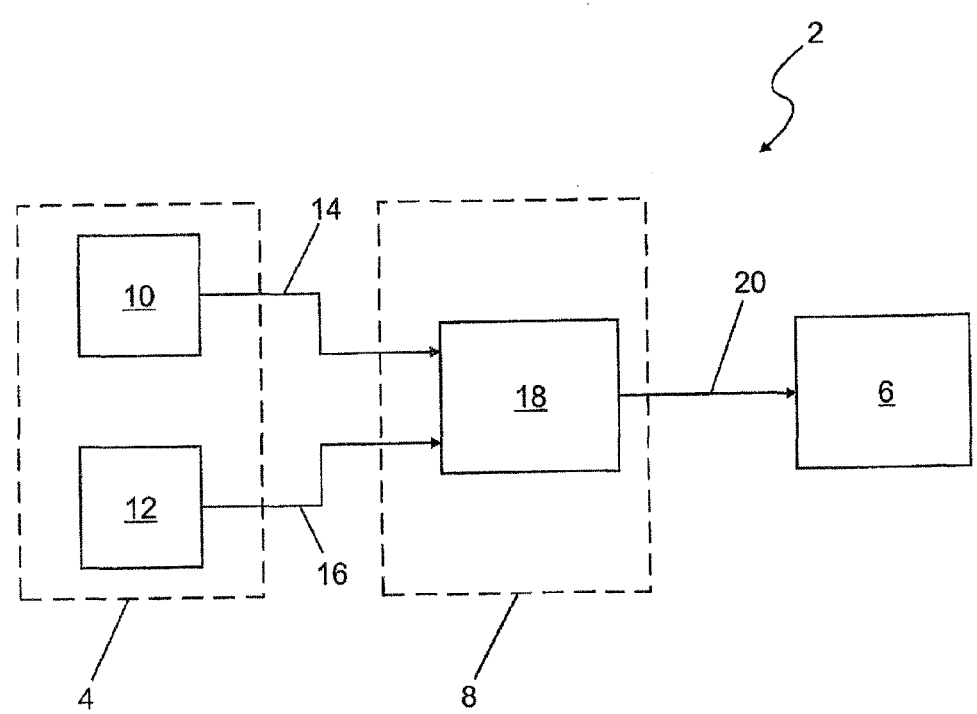
FIG. 1 shows a schematic block diagram including an operating device and a steering system.

FIG. 1 shows a schematic block diagram 2 including an operating device 4 and a steering system 6. A control unit 8 is located between the operating device 4 and the steering system 6. The operating device 4 is used to steer a vehicle, in particular a motor vehicle, by way of the steering system 6 and by way of the control unit 8. The operating device 4 comprises a control stick 10 and a control element 12.

Figure 5:
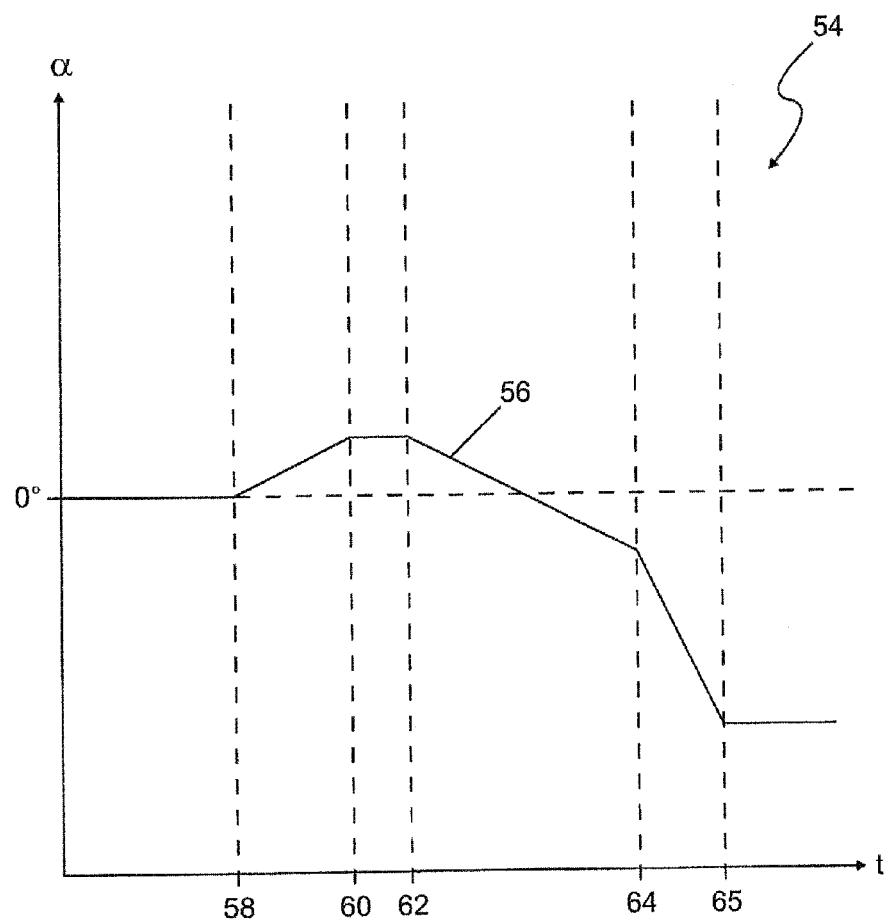
FIG. 5 is a schematic time diagram with a curve of the steering angle.

A first signal 14 is determined as a function of a state of the control stick 10. A second signal 16 is determined as a function of a state of the control element 12. The state of the control stick 10 and the state of the control element 12 each correspond to a position of the control stick 10 or of the control element 12 with respect to a respective reference. The first signal 14 and the second signal 16 are supplied to a functional block 18 of the control unit 8. A third signal 20 is determined as a function of the first signal 14 and as a function of the second signal 16. Using the third signal 20, a steering angle, which hereafter in FIG. 5 is denoted by the reference symbol α, can be supplied or specified to the steering system 6 by the functional block 18 or by the control unit 8. In one form, which is not shown, the steering system 6 comprises at least one actuator, which sets a steering position of at least one wheel of a vehicle as a function of the third signal 20, and thus as a function of the specified steering angle α.

The operating device 4 is operated by the driver of the vehicle. The vehicle driver can, for example, influence a state of the control stick 10 and a state of the control element 12. As described, the state of the control stick 10 relates to a position of the control stick 10, for example pivoting about an axis. The state of the control element 12 corresponds to a position of the control element 12, for example. The first signal 14 is generated as a function of the state or the position of the control stick 10. The second signal 16 is generated as a function of the state or the position of the control element 12. The functional block 18 determines the third signal 20 from the first signal 14 and the second signal 16.

In one form, which is not shown, additional signals can be supplied to the functional block 18, for example the first signal 14, or the second signal 16, can be superimposed with additional signals for driving safety functions and, as a result, can remain unconsidered at times, for example in a critical driving state, wherein the third signal 20 is generated by a further functional block, or the functional block 18, independently of the first signal 14 or the second signal 16. In an alternative embodiment, the control element 12 can be designed so that the state of the control element 12 does not refer to a position of the control element 12, but to the state of a tactile sensor, for example. As an alternative to the functional block 18 of the control unit 8, the signals 14 and 16 can, of course, also be merged and combined in a different manner, for example by way of analog circuits.

Figure 2:
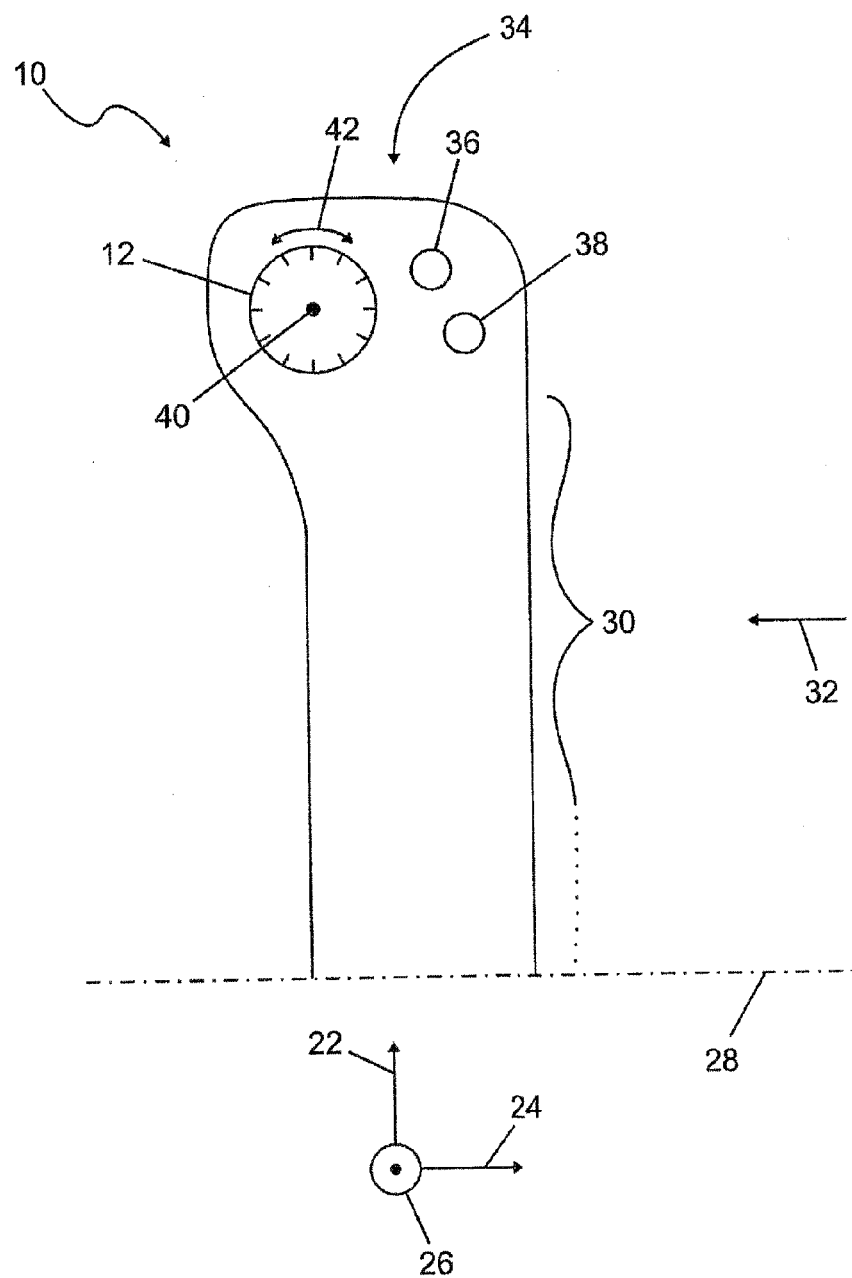
FIG. 2 is a schematic side view of a control stick.

FIG. 2 shows a schematic side view of the control stick 10. The control stick 10 extends along an axis 22. The control stick 10 is intended for operation by a human hand. The control stick 10 comprises a first button 36, a second button 38, and the control element 12 toward a free end 34. The axis 22, together with further axes 24 and 26, forms a three-dimensional Cartesian coordinate system. The control stick 10 is mounted counter to the direction of the axis 22 and below a line 28 by way of an associated bearing means, which is not shown, and has at least one degree of freedom. This degree of freedom can refer to a pivotability about the axis 24, for example. Of course the degree of freedom can also refer to a pivotability relative to the axis 22 of the axis 26. Further patterns of movement for the control stick 10 are, of course, also conceivable. The control stick 10 may also have several degrees of freedom. A region 30 is provided for pivoting, and thus for operating the control stick 10. So as to operate the control stick 10, the human hand moves toward the region 30 in a direction 32 and the hand clasps the control stick 10.

The control element 12 is designed as a turning wheel in FIG. 2. The control element 12 designed as a turning wheel is mounted rotatably about a rotational axis 40 in accordance with the double arrow 42. The control element 12 designed as a turning wheel further comprises a restoring mechanism, which is not shown and which is designed to always move the control element 12 designed as a turning wheel back to essentially the zero position after a deflection, which is brought about by the thumb of the human hand, for example. The restoring mechanism may be implemented by one or more spring elements, for example. As an alternative, the restoring mechanism is implemented by an actively controlled drive, for example a motor. A restoring mechanism, which is designed to move the control element 12 from a deflection position back to the zero position, is thus associated with the control element 12. The control element 12 has a single degree of freedom. The degree of freedom is a rotational degree of freedom about the rotational axis 40 in accordance with the double arrow 42. The control element 12 is disposed laterally on the control stick 10 toward the free end 34 of the control stick 10. As an alternative, the control element 12 may also be disposed in a different position of the control stick 10, for example counter to the axis 22 directly at the free end 34.

As an alternative to disposing the control element 12 on the control stick 10, the control element 12 may also be disposed in a region of the control stick 10, which is to say in the vicinity of the control stick 10 on a console. The control element 12 is thus disposed in a region of the control stick 10 that can be reached by a finger, for example, while the hand is resting. For example, if the hand is moved to the control stick 10 in the direction 32, with respect to FIGS. 2 and 3, the control element 12 can be disposed on the side of the control stick 10 counter to the direction 26 with respect to the control stick 10 so as to be operated by the index finger, for example. In an additional orientation of the arrangement of the control element 12 counter to the direction 24 with respect to the control stick 10, the hand can still at least partially clasp the control stick 10. This allows for a fast and secure operation of the control stick 10 when appropriate steering is required or in an appropriate driving situation.

Figure 3:
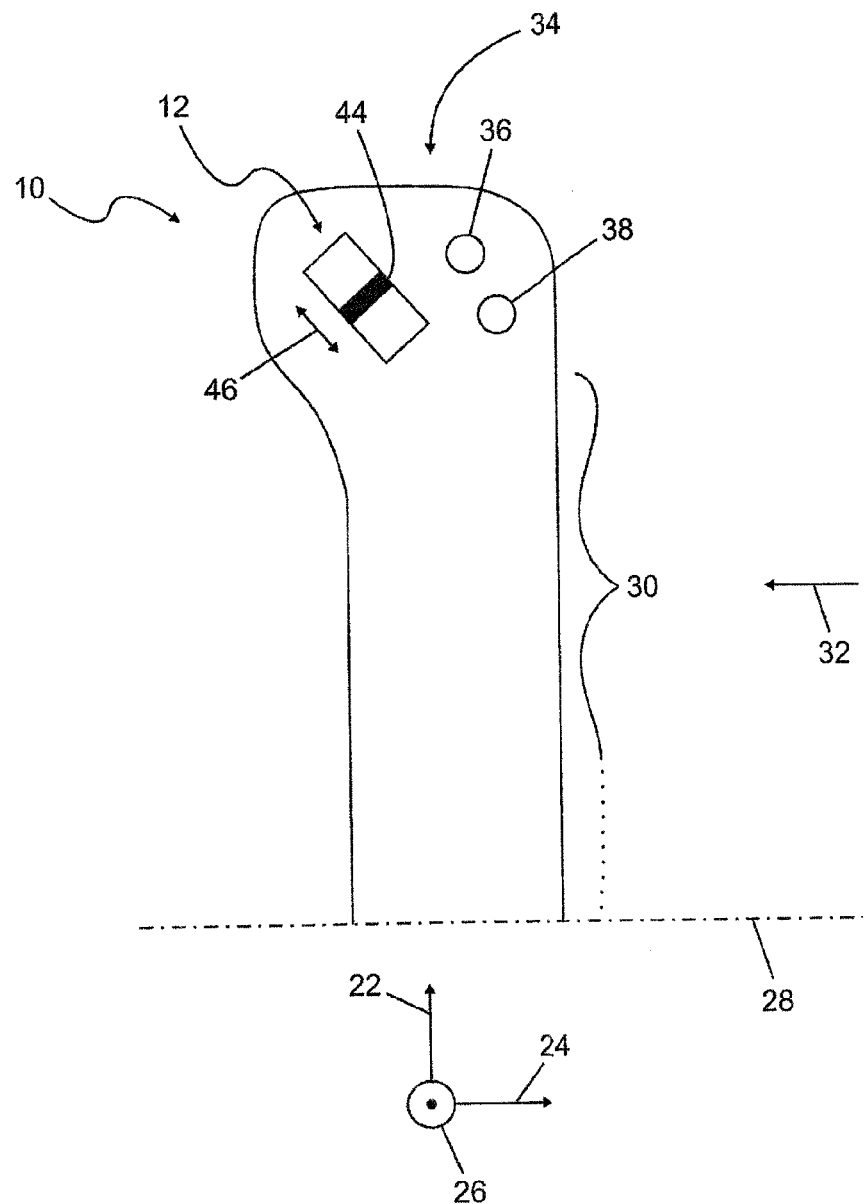
FIG. 3 is a schematic side view of the control stick in a further embodiment.

FIG. 3 shows a schematic side view of the control stick 10 in a further embodiment. FIG. 3 essentially differs from FIG. 2 only in the design of the control element 12. The comments provided for FIG. 2 can thus be substantially applied to FIG. 3. The control element 12 in FIG. 3 comprises an operating section 44, which can be used to vary the position of the control element 12 in accordance with the double arrow 46. The control element 12 of FIG. 3 will be described in more detail hereafter in FIG. 4.

Figure 4:
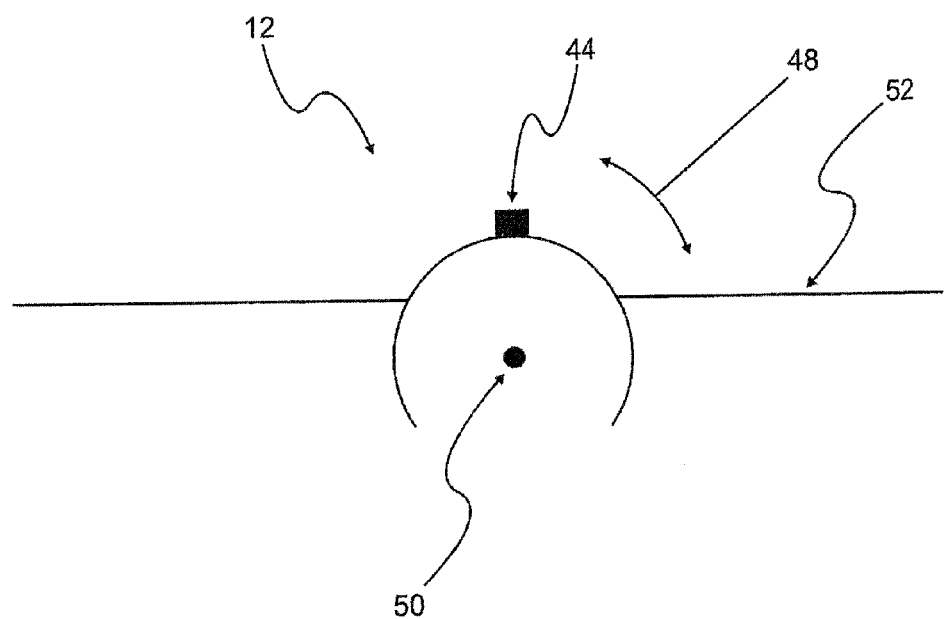
FIG. 4 shows one embodiment of a control element.

FIG. 4 shows the embodiment of the control element 12 according to FIG. 3. The control element 12 can be rotated about a rotational axis 50 by operating the operating section 44 in accordance with the double arrow 48. The rotational axis 50 is located within a housing of the control stick 10 in the embodiment according to FIG. 3. The wall of the housing of the control stick 10 is denoted by reference numeral 52. The control element 12 according to FIG. 4 thus has a single rotational degree of freedom.

As an alternative to the single rotational degree of freedom, the control element 12 can also have a single translatory degree of freedom. In this alternative embodiment of the control element 12, this element, for example as shown in the side view in FIG. 3, comprises an operating section 44, which can be displaced in translation, by way of the operating section 44, along an axis, in particular a longitudinal axis of the control element 12. In this alternative embodiment, the control element 12 can also be referred to as a sliding element.

FIG. 5 shows a schematic time diagram 54 with a curve 56 of the steering angle indicated by reference symbol α. The times 58, 60, 62 and 64 are plotted along a time axis t. The steering angle α of 0°, or zero degrees, is plotted along an axis for the steering angle α, which substantially corresponds to the vehicle driving straight ahead.

Up until the time 58, the curve 56 remains at the steering angle α of 0°. In this case, the control stick 10 is located in the zero position thereof, and the control element 12 is likewise located in the zero position thereof. In conjunction with FIG. 1, the first signal 14 thus essentially indicates straight-ahead travel, and the second signal 16 likewise essentially indicates straight-ahead travel. The functional block 18 generates the third signal 20 in a corresponding manner, which thus essentially corresponds to the curve 56 up until the time 58.

Proceeding from the time 58, the curve rises up until the time 60, essentially remains at a constant level up until the time 62 and, proceeding from the time 62, decreases up until the time 64, passing the steering angle α of 0°. The magnitude of the slope of the curve 56 in the region between the times 58 and 60 essentially corresponds to the magnitude of the curve 56 in the region between the times 62 and 64. Up until the time 64, the control stick 10 remains in the zero position thereof, so that the first signal 14 of FIG. 1 essentially corresponds to the steering angle α of 0°. The state of the control stick 10 thus essentially corresponds to the vehicle driving straight ahead. In contrast, the control element 12 is in a steering position, so that the second signal of FIG. 1 essentially corresponds to a steering angle different from 0°. The control element 12 is thus in a steering state at least part of the time. The third signal 20 of FIG. 1 is thus essentially determined from the second signal 16, or essentially as a function of the second signal 16.

The magnitude of the slope of the second signal 16 of FIG. 1, which is to say the change of the second signal 16 over time, in particular the angular change over time, is limited by a change threshold value. As an alternative or in addition, the magnitude of the second signal 16 of FIG. 1 can be limited by a threshold value. The first signal 14 may take on magnitudes or absolute values greater than the aforementioned threshold value for this purpose. The magnitudes or absolute values of the slope of the first signal 14 may take on greater values than the change threshold value with respect to the second signal 16. The control element 12 is thus particularly suited to pass on minor corrections with respect to the specified steering angle α to the steering system 6. In contrast, major corrections of the steering angle α must be specified by way of the control stick 10.

Proceeding from the time 64, the curve 56 decreases up until the time 65 with a magnitude of the slope greater than the magnitude of the slope of the curve in the region between the times 62 and 64. After the time 65, the curve 56 remains at a substantially constant value. Up until the time 64, only the control element 12 is in a steering state, the control stick 10 remaining in the zero position thereof, and thus not being in a steering state. In contrast, the control stick 10 is in the steering state thereof in the region between the times 64 and 65, so that the first signal 14 of FIG. 1 essentially corresponds to a value of the steering angle α different from 0°. The control element 12 is also in the steering state thereof in the region between the times 64 and 65, so that the second signal 16 of FIG. 1 essentially corresponds to a steering angle α different from 0°. The functional block 18 of FIG. 1 then ensures that the first signal 14 and the second signal 16 are superimposed and the curve 56 between the times 64 and 65 is set. In the region between the times 64 and 65, the control stick 10 must be in the steering state because the steering state of the control element 12, as compared to the steering state of the control stick 10, has only limited impact on the steering angle α. In particular, the slope of the curve of the steering angle α or the value of the steering angle α, is limited as a function of the state of the control element 12. Because the operation of the control element 12 alone between the time 62 and the time 64, is no longer sufficient, depending on the driving situation when driving in a curve, so that after the time 64, the control stick 10 likewise must be operated and transferred to the steering position thereof.

As an alternative to the described relationships between the time 64 and the time 65, the control element 12 may also be in the zero position thereof and/or the second signal 16 may be disregarded between the times 64 and 65 in the determination of the third signal 20. According to this alternative embodiment, the state of the control element 12 is not considered in a steering state of the control stick 10.

With respect to the determination of the signal 16 of FIG. 1, there are two options. Hereafter, it is assumed that the control stick 10 is in the zero position thereof. If the vehicle driver transfers the control element 12 into the steering state thereof, the third signal 20 is determined in keeping with the deflection of the control element 12, and thus as a function of the second signal 16. In the first option for determining the third signal 20, the third signal 20 returns to the state prior to the deflection of the control element 12, when the control element 12 is released, following the deflection thereof, and automatically returns to the zero position thereof by way of the restoring mechanism. In the second option of executing the second signal 16 or the third signal 20, the third signal 20 remains at a value that is derived from the deflection of the control element 12 and the duration of the deflection of the control element 12, after the control element 12 has been released and returned to the zero position thereof.

Between the times 58 and 60, and between the times 62 and 64, the operating device 4 is in a first operating mode. The operating device 4 is in a second operating mode between the times 64 and 65.

The methods described above can be carried out as computer programs for a digital arithmetic unit. The digital arithmetic unit is adapted to carry out the above-described methods as computer programs. The operating device 4 is provided in particular for a motor vehicle and, together with the steering system 6, is associated with the control unit 8, which comprises the digital arithmetic unit, in particular a microprocessor. The control unit 8 comprises a storage medium on which the computer program is stored.

The invention claimed is:
1. An operating device for steering a vehicle, the operating device comprising a control stick and a control element; and
wherein the control stick and the control element are concurrently operable to control vehicle steering during a steering maneuver;

wherein a state of the control stick relative to at least one degree of freedom determines a first signal which contributes a first control contribution of a steering angle ($\alpha$) of the vehicle;

wherein a position of the control element is adjustable during operation of the control element determines a second signal that contributes a second control contribution of the steering angle ($\alpha$) of the vehicle;

wherein a third signal, corresponding to said steering angle ($\alpha$) of the vehicle, is determined as a function of the first signal and the second signal with said third signal varying during said steering maneuver due to a change of said state of the control stick and said position of the control element, said second control contribution dynamically adjusting said steering angle as a correction of said first control contribution during said steering maneuver.

2. The operating device according to claim 1, wherein the control element is disposed on the control stick.

3. The operating device according to claim 1, wherein the control element is disposed on a console in the region of the control stick.

4. An operating device according to claim 1, wherein the control element has a single degree of freedom.

5. An operating device according to claim 1, wherein the control element has a zero position and is manually deflectable from the zero position, and further comprising a restoring mechanism associated with the control element, wherein the restoring mechanism brings the control element back to the zero position automatically after manual deflection when an operator releases the control element.

6. A steering system, comprising an operating device according to claim 1.

7. A method for steering a vehicle by way of an operating device comprising a control stick and control element, the control stick configured for operation by a human hand and having at least one degree of freedom, the method comprising:

determining a first signal, which contributes a first control contribution of a steering angle ($\alpha$) of the vehicle, based on a state of the control stick relative to said at least one degree of freedom;

determining a second signal, which contributes a second control contribution of the steering angle ($\alpha$) of the vehicle, based on a position of the control element;

concurrently operating said control stick and said control element during a steering maneuver with said control stick being operated so that said second control contribution is an adjustment to said first control contribution to correct the steering angle of the vehicle;

during said concurrently operating, responding to a change of said state of the control stick relative to said at least one degree of freedom during said steering maneuver to produce a change in said first signal;

during said concurrently operating, responding to a change of said position of the control element during said steering maneuver to produce a change in said second signal; and determining a third signal as a function of the first signal and the second signal, wherein the third signal varies during said steering maneuver due to said change of said state of the control stick and said change of position of the control element.

8. The method according to claim 7, wherein in a second operating mode of the operating device, the first signal corresponds to the steering angle ($\alpha$) different from zero degrees, and the second signal corresponds to the steering angle ($\alpha$) different from zero degrees.

9. A method according to claim 7, wherein an absolute value of an angular change over time of the second signal is limited by a change threshold value, and an absolute value of an angular change over time of the first signal can take on values above the change threshold value.

10. A method according to claim 7, wherein an absolute value of the second signal is limited by a threshold value, and an absolute value of the first signal can take on values above the threshold value.

11. A non-transitory computer readable storage medium that stores a computer program for a digital arithmetic unit which is configured by the computer program during execution to carry out the method according to claim 7.

12. A control unit for the operating device, the control unit provided with a digital arithmetic unit, said digital arithmetic unit configured to perform said determining said first signal, said determining said second signal, and said determining said third signal of the method of claim 7.

13. The control unit of the operating device according to claim 12, further comprising a non-transitory computer readable storage medium that stores a computer program for said digital arithmetic unit, said digital arithmetic unit being configured by the computer program during execution to perform said determining said first signal, said determining said second signal, and said determining said third signal.

* * * * *